(12) United States Patent
Harrison et al.

(10) Patent No.: US 6,526,210 B1
(45) Date of Patent: Feb. 25, 2003

(54) OPTICAL CONNECTOR RETAINER PANEL AND SYSTEM

(75) Inventors: Carl G. Harrison, Plano, TX (US); Bradley S. Hoyl, Frisco, TX (US); Denise L. Smart, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/604,355

(22) Filed: Jun. 27, 2000

(51) Int. Cl.[7] .................................................. G02B 6/00
(52) U.S. Cl. ...................................................... 385/134
(58) Field of Search ................................ 385/134, 147, 385/59

(56) References Cited

U.S. PATENT DOCUMENTS

| | | | |
|---|---|---|---|
| 4,696,438 A | 9/1987 | Myers | 242/118.41 |
| 4,783,954 A | 11/1988 | Akre | 57/9 |
| 4,792,203 A | 12/1988 | Nelson et al. | 350/96.2 |
| 4,995,688 A | 2/1991 | Anton et al. | 350/96.1 |
| 5,013,121 A | 5/1991 | Anton et al. | 350/96.2 |
| 5,066,149 A | 11/1991 | Wheeler et al. | 385/135 |
| 5,067,678 A | 11/1991 | Henneberger et al. | 248/68.1 |
| 5,123,071 A * | 6/1992 | Mulholland et al. | 385/53 |
| 5,179,618 A | 1/1993 | Anton | 385/136 |
| 5,208,894 A | 5/1993 | Johnson et al. | 385/135 |
| 5,214,735 A | 5/1993 | Henneberger et al. | 385/136 |
| 5,287,426 A | 2/1994 | Shahid | 385/85 |
| 5,301,884 A | 4/1994 | Horneman | 242/7.09 |
| 5,316,243 A | 5/1994 | Henneberger et al. | 248/68.1 |
| 5,339,379 A | 8/1994 | Kutsch et al. | 385/135 |
| 5,497,444 A | 3/1996 | Wheeler | 385/135 |
| 5,647,043 A * | 7/1997 | Anderson et al. | 385/78 |
| 5,717,810 A | 2/1998 | Wheeler | 385/135 |
| 5,758,003 A | 5/1998 | Wheeler et al. | 385/134 |
| 5,761,368 A | 6/1998 | Arnett et al. | 385/134 |
| 5,778,130 A * | 7/1998 | Walters et al. | 385/134 |
| 5,915,062 A | 6/1999 | Jackson et al. | 385/137 |
| 5,946,440 A | 8/1999 | Puetz | 385/135 |
| 6,024,610 A * | 2/2000 | Schaffer | 439/719 |

* cited by examiner

Primary Examiner—Lynn D. Feild
Assistant Examiner—Brian S. Webb
(74) Attorney, Agent, or Firm—Campbell Stephenson Ascolese LLP

(57) ABSTRACT

A connector retainer panel provides a number of openings for connector adapters, where the number of openings is an integer power of 2. Each of the adapters is any type of optical adapter that mates two connectors. The connector adapters are placed within the panel in a vertical orientation, in a side-by-side relation to one another. Mounting holes may be provided in order to attach the connector adapters to the panel. Additional mounting holes may be provided to mount the retainer panel to a chassis. Within a chassis, multiple retainer panels are provided in a top-to-bottom orientation.

15 Claims, 12 Drawing Sheets

350

350

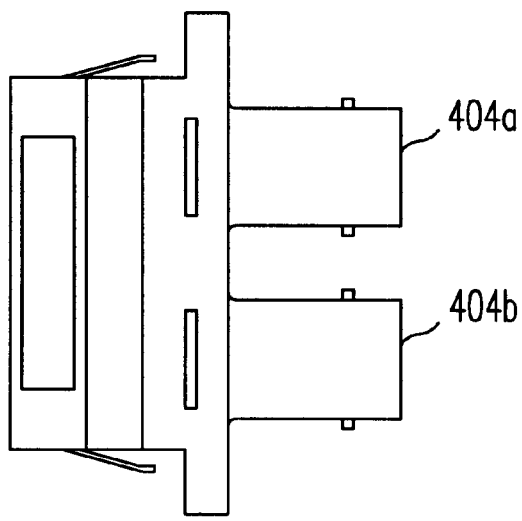
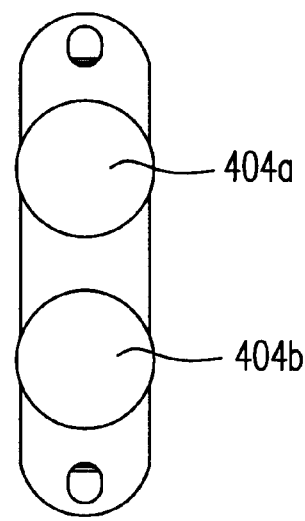
FIG. 4B
(Prior Art)
FIG. 4C
(Prior Art)
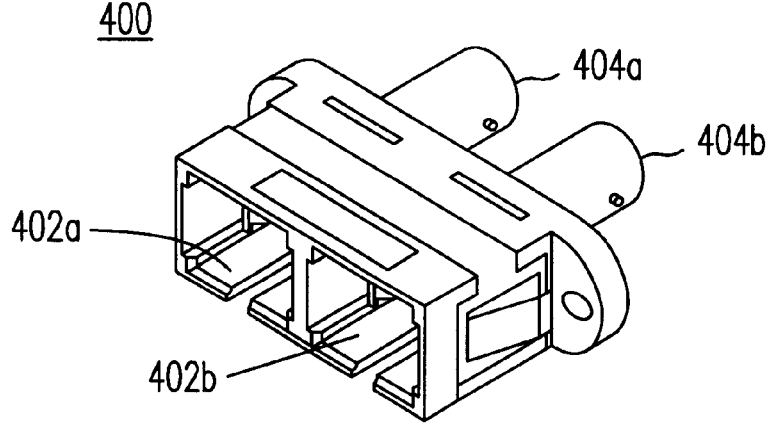
FIG. 4A
(Prior Art)

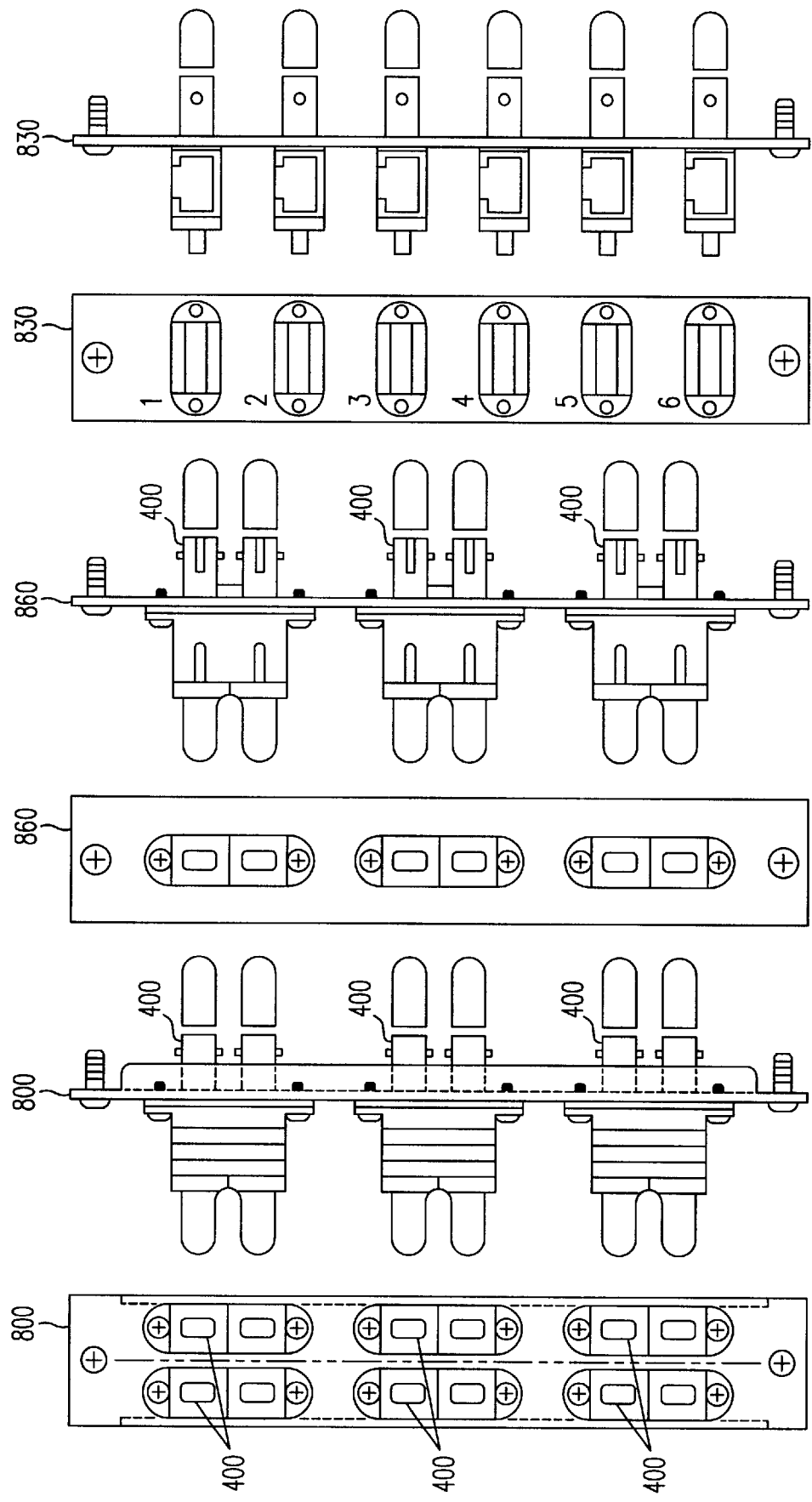

OPTICAL CONNECTOR RETAINER PANEL AND SYSTEM

BACKGROUND OF THE INVENTION

1. Field of the Invention

The present invention relates to fiber optic telecommunications equipment and, in particular, to an adapter panel system that is configured to retain optical connectors to a chassis.

2. Description of the Related Art

In the telecommunications and data transmission industries, optical fibers, rather than metal cables, are used increasingly to transmit signals. The technology uses glass or plastic threads (fibers) to transmit data. A fiber optic cable consists of a bundle of threads, each of which is capable of transmitting messages modulated into light waves. Technologies that transmit data over metal cables, rather than fiber optic cables, transmit data in analog form. Fiber optic technology allows data to be transmitted digitally rather than anlogically. Fiber optic data transmissions, being digital, are in the natural form for computer-related data.

The use of optical fibers to transmit data in the telecommunications industry has grown dramatically in recent years. With the increased use of optical fiber transmission paths, the industry has experienced a dramatic need for new and improved ways to effect fiber optic connections and splices efficiently and with as little overhead costs as possible. This need becomes more critical and difficult to meet in newer systems that require increasingly large numbers of cables to be efficiently housed in a relatively small space. The difficulty is compounded by the fact that many systems for organizing fiber optic cables within a fiber optic telecommunications system were not designed with computer applications in mind.

Fiber optic telecommunications systems are being increasingly managed by computerized applications. The result is that many systems that were originally created for analog systems are not practical for computerized telecommunications systems. There is a need for a system of panels that retain fiber optic cable connectors in a configuration that is efficient, utilizes as little space as possible, and facilitates computerized applications related to fiber optic telecommunications.

SUMMARY OF THE INVENTION

A system of organizing optical connector adapters is presented. They system can utilize one or more panels that releasably retain optical connector adapters.

At least one embodiment of a connector retainer panel includes a planar frame having a front surface and a back surface. The frame defines a plural number of adapter openings, where the plural number is an integer power of 2. Each of the adapter openings can receive at least one connector adapter in a vertical orientation, where the adapter is any type of optical adapter that mates two connectors. The adapter openings are organized within the planar frame in a side-by-side orientation. At least one embodiment of the retainer panel includes a top surface and a bottom surface. A pair of mounting holes is provided in the retainer panel for each connector adapter that can be mounted in the panel. The first one of the pair of mounting holes is defined along the top surface, while the second of the pair of mounting holes is defined along the bottom surface.

A connector retainer system is also disclosed. The connector retainer system includes a chassis that holds a plurality of the retainer panels described above. The system includes a plurality of connector adapters, and a plurality of first and second mating connectors. The mating connectors are secured to the connector adapters so that the first mating connectors extend outwardly from the front surface of the frame at a substantially orthogonal angle and the second mating connectors extend outwardly from the back surface of the frame at a substantially orthogonal angle.

A method for providing a connector retainer system includes coupling a plurality of planar frames to a chassis in a top-to-bottom relation. The method further includes coupling a plurality of connector adapters, in a vertical orientation, to adapter openings within the planar frames, in a side-to-side relation. The method further includes coupling at least one set of first and second mating connectors to the plurality of connector adapters.

A system provides a plurality of planar frames for coupling a plural number of connector adapters together in a side-by-side relation in a vertical orientation, where the plural number of connector adapters is an integer power of 2. The system further provides a chassis means for coupling the plurality of frames together in a top-to-bottom orientation. The system further includes at least one means for joining two optical fibers.

BRIEF DESCRIPTION OF THE DRAWINGS

The present invention may be better understood, and its numerous objects, features, and advantages made apparent to those skilled in the art by referencing the accompanying drawings.

FIG. 1, which includes

FIG. 4, which includes FIGS. 4A, 4B, and 4C, illustrates a duplex SC-to-ST optical connector adapter.

FIG. 5, which includes

FIGS. 8A, 8B, 8C, 8D, 8E, and 8F illustrate various embodiments of adapter plates for ST-to-SC e connectors.

The use of the same reference symbols in drawings indicates identical items unless otherwise noted.

DETAILED DESCRIPTION

In a fiber optic communications system, it is necessary from time to time to splice or join optical fiber cables. A plurality of optical fiber cable connectors are known in the industry and are commercially available.

Figure 1A:
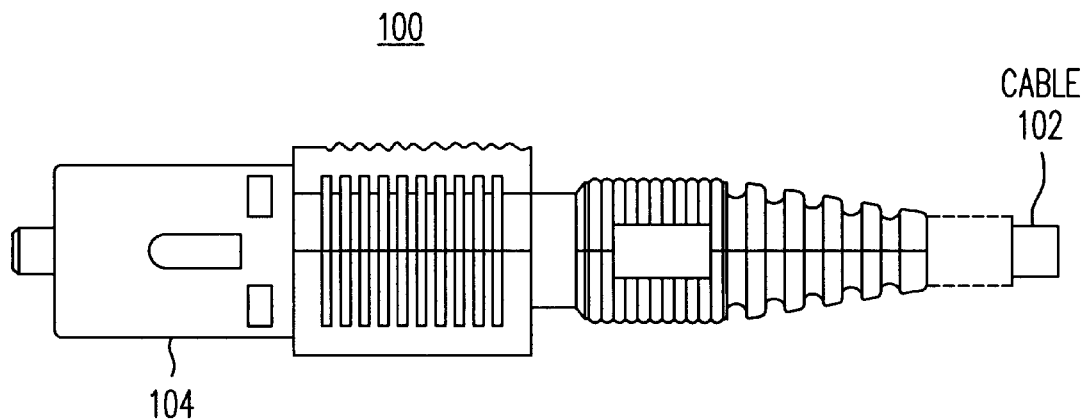
FIG. 1A and FIG. 1B, is a side view of an optical connector.
Figure 1B:
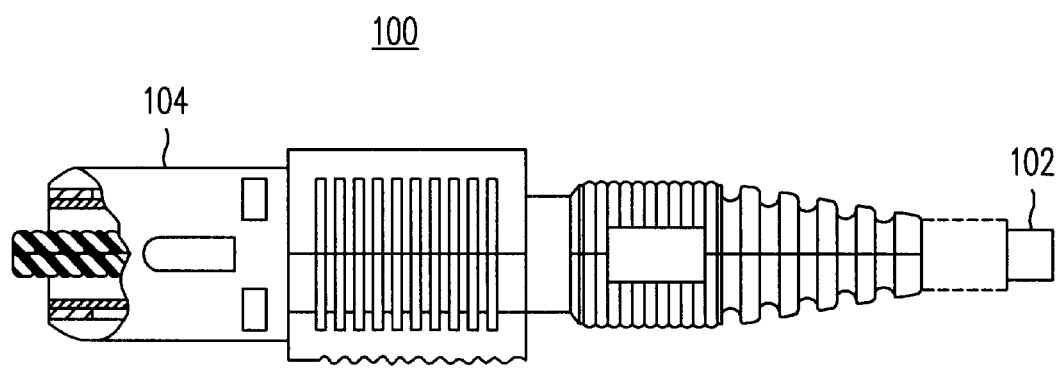

FIG. 1, including FIG. 1A and FIG. 1B, is a side view of a commonly available optical connector 100. The connector 100 conforms to a standard known as NTT-SC and is referred to as a square connector ("SC") connector. Nippon Telephone and Telegraph ("NTT") developed the SC standard, whose name refers to the square shape of the connectors. Each connector 100 surrounds the end of an optical cable 102 and provides a mechanism 104 for the optical cable 102 to be mated with a second connector 120. When the connector 100 is mated with the second connector 120, a connection is created between the two connectors' optical cables 102, 122. This general scheme is true of other types of commercially available connectors as well, such as the ST and FC connectors discussed below.

Figure 5B:
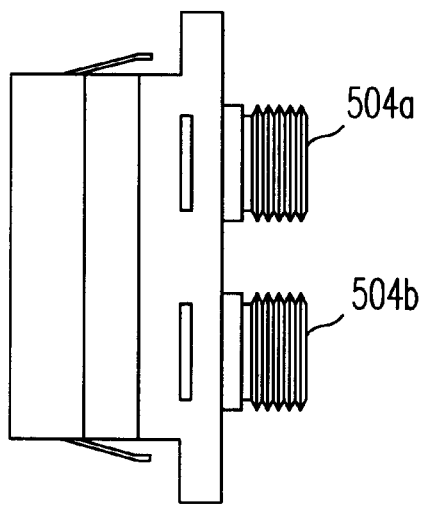
FIGS. 5A, 5B, and 5C, illustrates a duplex SC-to-FC optical connector adapter.
Figure 5C:
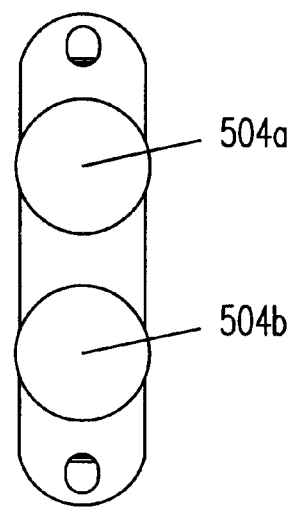
Figure 5A:
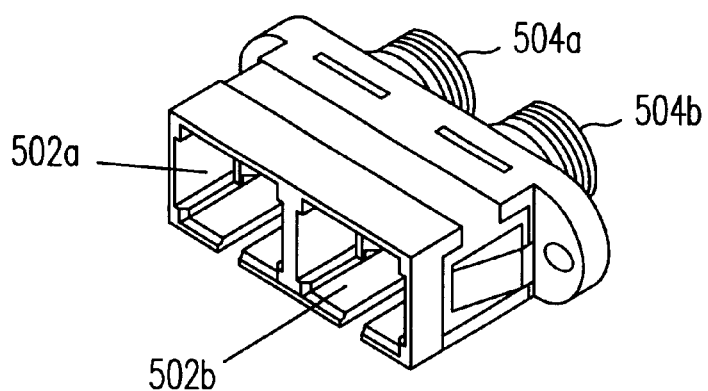

FIGS. 3 through 6 illustrate that, in addition to SC connectors, other connector types are commonly available, such as those that conform to the straight tip ("ST") standard developed by American Telephone and Telegraph ("AT&T") and those conforming to the face connect ("FC") standard developed by NTT. For instance, FIG. 3A illustrates an adapter 300 that is configured to receive and mate SC connectors with other SC connectors. FIG. 4 illustrates an adapter 400 that is configured to receive and mate SC connectors with ST connectors. FIG. 5 illustrates an adapter 500 that is configured to receive and mate SC connectors with FC connectors.

Figure 2:
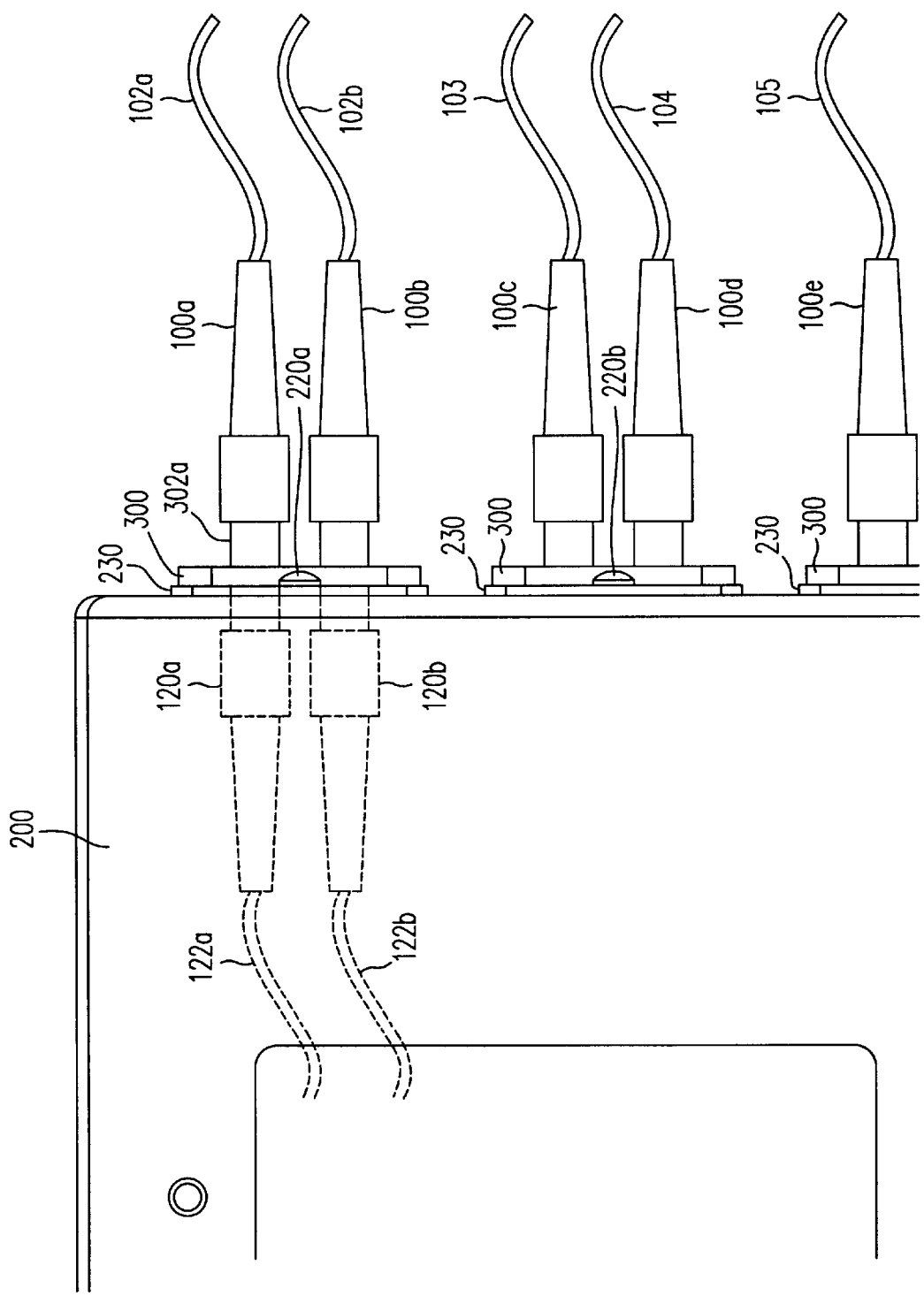
FIG. 2 is a side view of a system employing optical connector retainer panels according to at least one embodiment of the present invention.

FIG. 2, a side view, illustrates that most typical fiber optic communications systems include multiple optical cables 102, 103, 104, 105. While only five optical cables are illustrated in FIG. 2 for ease of discussion and clarity, it will be understood that a fiber optic communications system may include any number of cables. In order to organize these cables 102–105 into a manageable system, multiple connectors 100 are mounted onto a housing chassis 200. Connections between fiber optic cables (102, 122) are effected by coupling mating connectors 120 from within the housing chassis 200 to the connectors visible from the front of the housing chassis 200. Adapters facilitate this mating of connectors.

FIGS. 3A through 5B illustrate various types of adapters 300, 350, 400, 500 that are used to facilitate the mating of connectors to form connections between optical cables. When a connector 100 is mounted on the housing chassis 200 (FIG. 2), it is usually mounted into an adapter 300, 350, 400, 500. An adapter is a housing that is used to facilitate a connection between two connectors. Common adapters either facilitate a single connection between two cable connectors 100 (e.g., a simplex adapter 350) or come in the form of duplex adapters 300, 400, 500 in which two connections (i.e., four connectors) are mated.

Figure 3B:
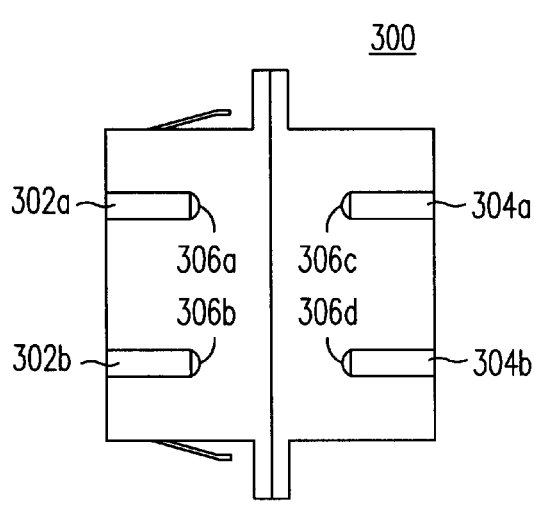
FIGS. 3A, 3B, and 3C are plan, side, and front views, respectively, of a duplex SC-to-SC optical connector adapter.
Figure 3C:
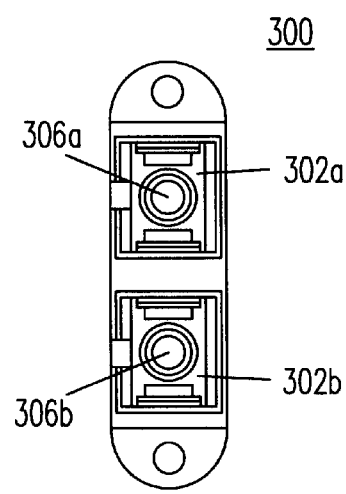
Figure 3A:
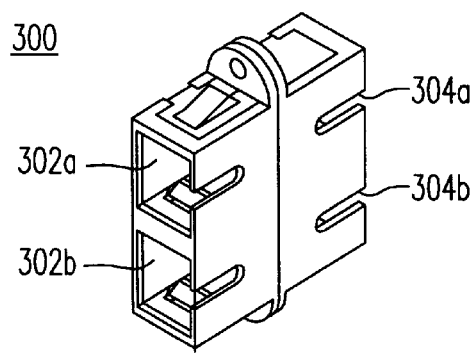
Figure 3D:
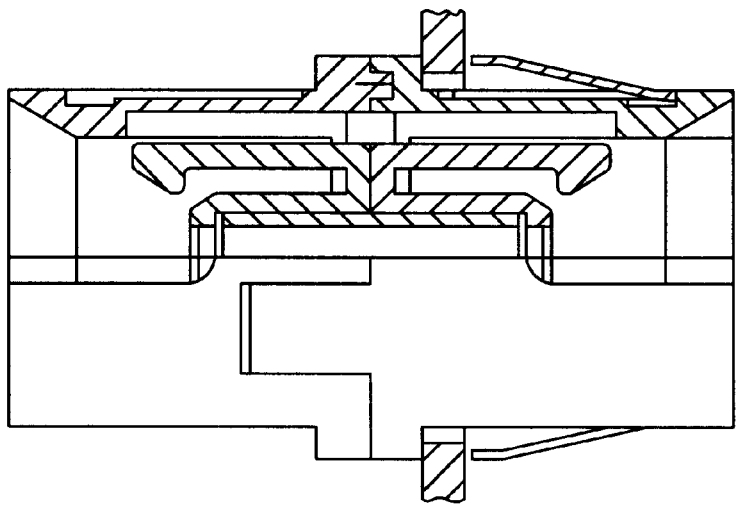
FIGS. 3D and 3E are side and front views, respectively, of a simplex SC optical connector adapter.
Figure 3E:
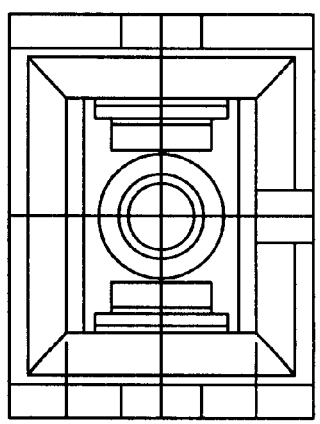

FIGS. 2, 3A, 3B and 3C serve as a reference for discussing properties common to most typical adapters 300, 350, 400, 500. The adapter 300 forms connector housings 302, 304 into which each removable connector 100, 120 may be placed. The adapter 300 is shaped to form a housing 302 into which the first connector 100 fits. The adapter 300 is shaped to form a second housing 304 into which the second connector 120a fits to create a mated connection between the first 100a cable 102a and the second connector's 120a cable 122a. FIG. 3B illustrates that the housings 302, 304 are shaped to form an opening 306 through which the laser energy can transfer between the cables 102, 122 mated in a connection.

FIGS. 4 and 5 illustrate that an adapter can facilitate a connection between two different connector types. FIG. 4 illustrates a duplex adapter 400 that provides for the mating of SC connectors to ST connectors. FIG. 5 illustrates a duplex adapter 500 that provides for the mating of SC connectors to FC connectors.

Figure 6E:
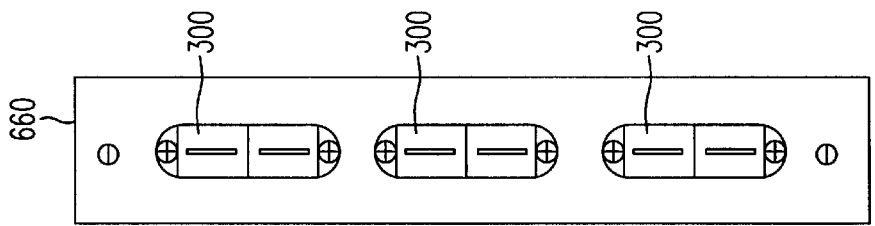
FIGS. 6A, 6B, 6C, 6D, and 6E illustrate various embodiments of adapter plates for SC-style connectors.
Figure 6D:
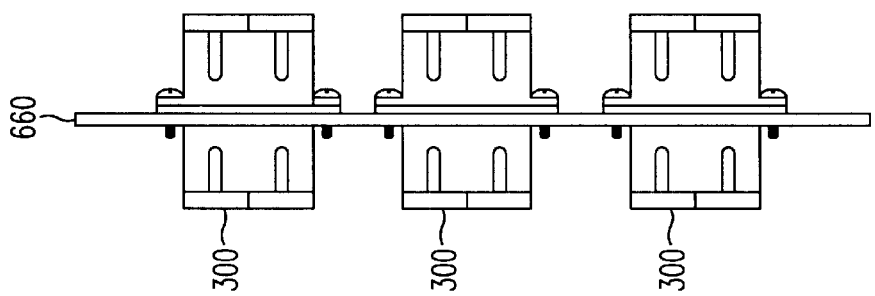
Figure 6C:
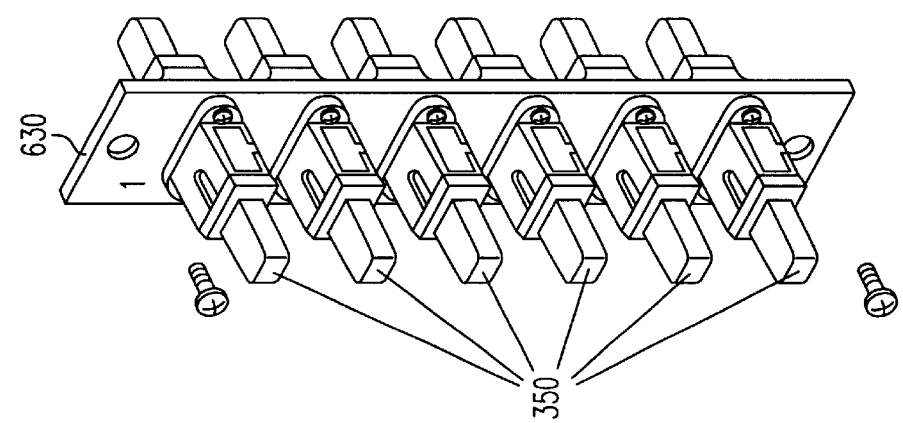
Figure 6B:
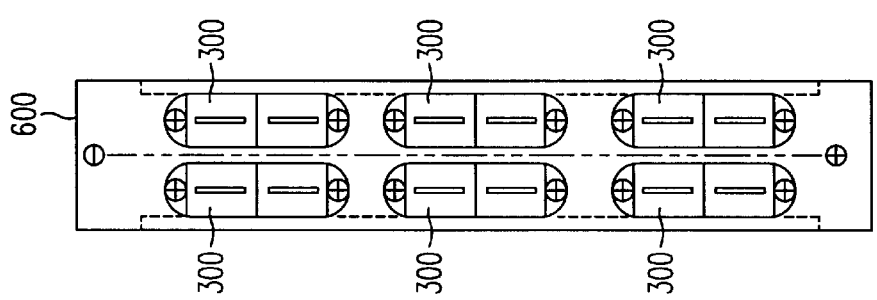
Figure 6A:
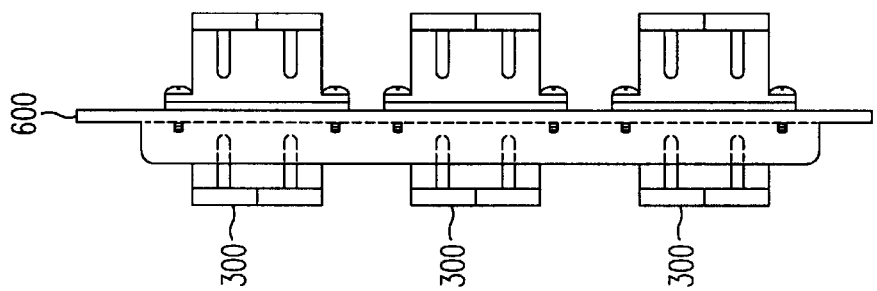

FIGS. 2 and 6A through 8F illustrate that, rather than being retained directly into the chassis 200, most adapters 300, 350, 400, 500 are mounted in an adapter panel 600, 630, 660, 700, 730, 760, 800, 830, 860 that can then be mounted to the chassis. This allows the same chassis 200 the versatility to accommodate various configurations of, and types of, connectors. FIGS. 6A through 8F illustrate various adapter panels. Each panel organizes connectors into groups of six simplex connectors (six ports) or six duplex connectors (12 ports). None of these common configurations corresponds to an integer power of 2, such as $4(2^2)$, $8(2^3)$, or $16(2^4)$. FIG. 6 illustrates various embodiments 600, 630, 660 of adapter plates for SC-style connectors. FIGS. 6A and 6B illustrate front and side views, respectively, of a 12-port duplex SC-to-SC adapter panel. FIG. 6C illustrates a 6-port simplex SC-to-SC adapter panel. FIGS. 6D and 6E illustrate side and front views, respectively, of a 6-port duplex SC-to-SC adapter panel.

FIG. 7 illustrates various embodiments 700, 730, 760 of adapter plates for ST-style connectors. FIGS. 7A and 7B illustrate front and side views, respectively, of a 12-port duplex ST-to-ST adapter panel 700. FIG. 7C illustrates a 6-port simplex ST-to-ST adapter panel. FIGS. 7D and 7E illustrate front and side views, respectively, of a 6-port duplex ST-to-ST adapter panel. FIG. 8 illustrates various embodiments 800, 830, 860 of adapter plates for SC-to-ST connectors. FIGS. 8A and 8B illustrate front and side views, respectively, of a 12-port duplex ST-to-SC adapter panel. FIGS. 8C and 8D illustrate front and side views, respectively, of a 6-port duplex ST-to-SC adapter panel. FIGS. 8E and 8F illustrate front and side views, respectively, of a 6-port simplex ST-to-SC adapter panel.

In a dense fiber optic telecommunications system that incorporates significant computer software components, such as computerized switching control; certain issues arise related to the configuration of the connectors within the housing chassis 200. One such issue is that, because computer systems are based on a binary system, the connectors should be organized in such a way that "in" and "out" connectors are placed to intuitively mimic the 1b'0' and 1b'1' values of a binary digit. Another issue is that, in dense systems, the fiber cables 102, 103, 104, 105, 122 should be placed as closely together as possible and in a manner as to avoid crossing of cables as much as possible. Another issue is that the connectors should be organized into groupings of N ports, where N is an integer power of 2; that is, $N=2^x$, where x is greater than zero. Typical adapter plates do not sufficiently address these issues.

FIGS. 6A through 8F illustrate that typical adapter panels 600, 630, 660, 700, 730, 760, 800, 830, 860 do not provide a configuration of ports that corresponds to an integer power of 2. It is standard in the fiber optic telecommunications industry for adapter panels to provide a configuration of M ports, where M is a multiple of three. For instance, a connector module utilizing an adapter panel that provides six adapter openings is disclosed in U.S. Pat. No. 5,179,618 entitled "Fiber Optic Connector Module" and issued to Anton.

It would be useful to operators and technicians of the fiber optic systems, as well as to computer programming and test personnel, to arrange connectors in groups corresponding to an integer power of 2. For instance, in a computer programming application based on a 16-bit register structure, an adapter panel accommodating sixteen connector ports would allow each port to intuitively correspond in a very logical way to the sixteen bits of a register. As is commonly known, a register is a set of bits of memory within a microprocessor or other electronic device, used to hold data for a particular purpose. Furthermore, a binary representation of the ordinal number corresponding to each of 16 ports (i.e., numbers 0 through 15) can be easily represented with four bits, with 64 ports being capable of representation in a 16-bit register, and 128 ports being capable of representation in a 32-bit register. For each of these schemes, a 16-port adapter plate configuration would allow the connectors to be arranged in a way that logically corresponds to hardware and software structures performing software control and monitoring of fiber optic communications. Because of the limited space considerations attendant to dense fiber optic applications, it would also be desirable to arrange connectors so that they are placed as close as possible to one another.

Figure 9:
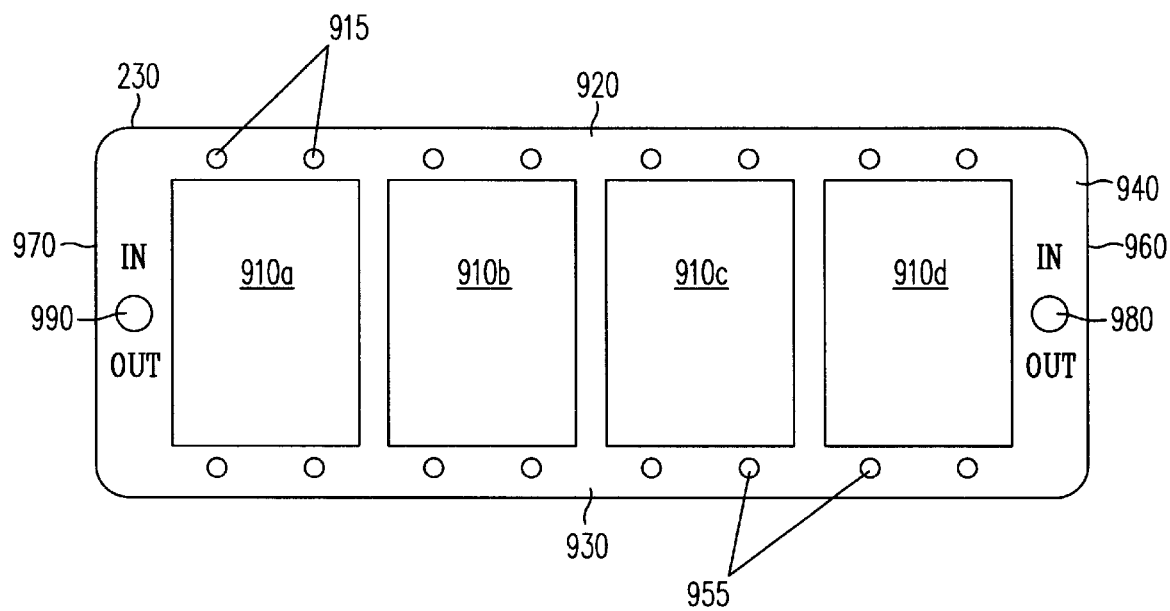
FIG. 9 is a front view of an optical connector adapter panel according to at least one embodiment of the present invention.
Figure 10:
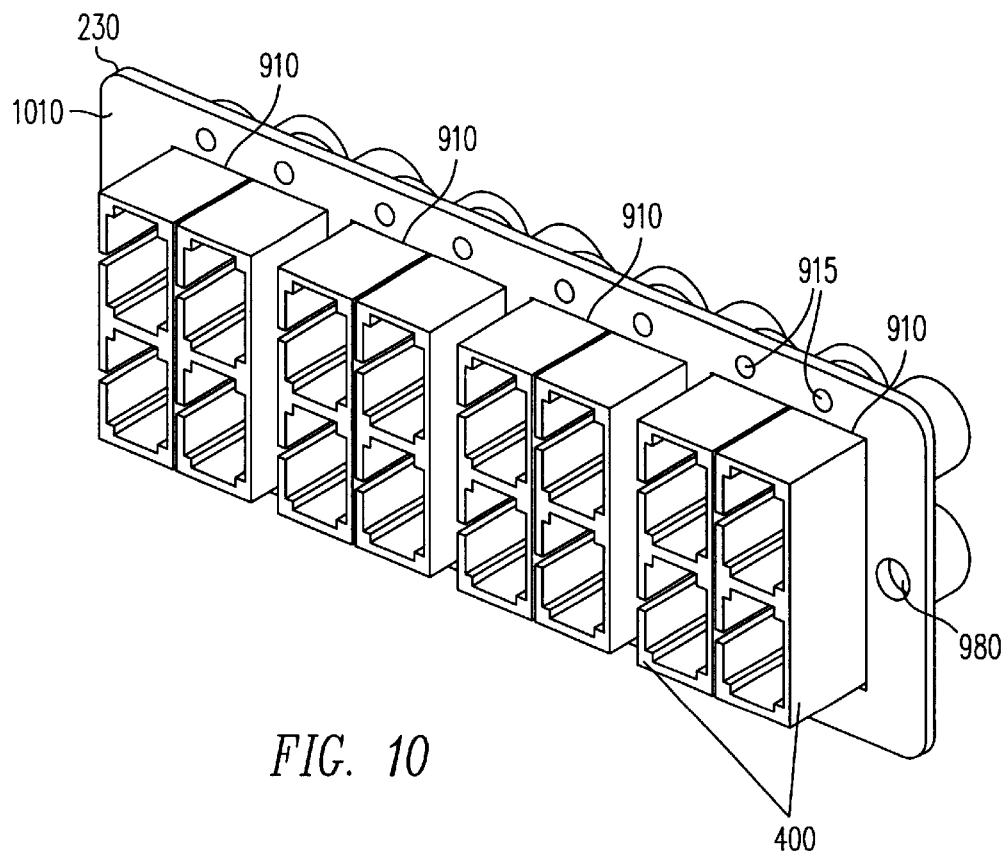
FIG. 10 is a rear view of an optical connector adapter panel according to at least one embodiment of the present invention.

FIG. 9 illustrates an optical connector retainer panel 230 according to one embodiment of the present invention. FIGS. 2, 7, and 8, including FIG. 8A and FIG. 8B, illustrate that the panel 230 is a planar frame, rectangular in shape, that has a front surface 940 and a back surface 1010 (FIG. 10). The panel 230 has a top portion 920 and a bottom portion 930, which are connected by two parallel side portions 960, 970. The panel is shaped to form a series of adapter mounting holes 915, 955 along the top portion 920 and the bottom portion 930.

Figure 11:
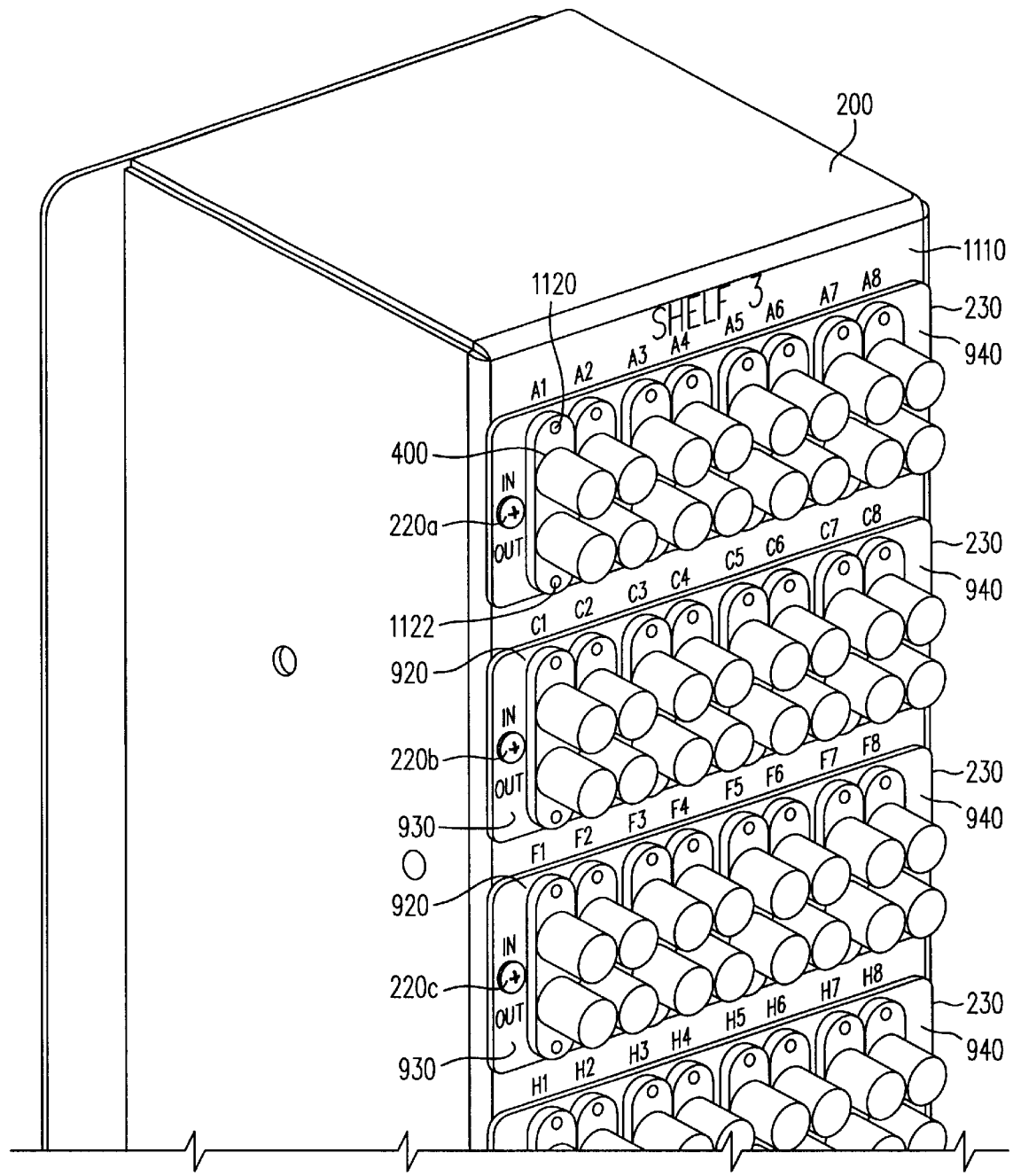
FIG. 11 is a plan view of a system employing optical connector retainer panels according to at least one embodiment of the present invention.

FIG. 11 illustrates that the adapter mounting holes 915, 955 are shaped, sized, and positioned within the retainer panel 230 so that they are capable of receiving a securing device 1120, 1122, such as a screw, nail, rivet, or other securing device, in order to secure the vertically-mounted connector adapters 400 to the retainer panel 230. In the case of screws used as securing devices 1120, 1122, the adapters may be easily removed from the retainer panel 230. One skilled in the art will realize that the retainer panel 230 can be made more compact by deleting the mounting holes 915, 955 and accordingly reducing the height of the top portion 920 and bottom portion 930, respectively. A retainer panel 230 without mounting holes 915, 955 can be used with connector adapters that snap into the retainer panel 230 without the use of mounting flanges.

FIGS. 9 and 10 illustrate an embodiment wherein one upper adapter mounting hole 915 and one lower adapter mounting hole 955 corresponds to each position where a duplex fiber optic connector adapter 400 is capable of being mounted within the retainer panel.

FIGS. 2, 9 and 11 illustrate that the retainer panel 230 is also shaped to form a chassis mounting hole 980, 990 in each side portion 960, 970. The chassis mounting holes 980, 990 are shaped, sized, and positioned so that they are capable of receiving a securing device 220, such as a screw, nail, rivet, or other securing device, in order to secure the retainer panel 230 to the chassis 200. In the case of screws used as the securing device 220, the adapter panel 230 may be easily removed from the chassis 200. One skilled in the art will recognize that the adapters, retainer panel 230, and chassis 200 may be coupled together by means other than the securing devices 1120, 1122, 220 discussed above. For instance, such coupling may be accomplished through the use of an adhesive material or spot welding.

The panel 230 is shaped to form a series of side-by-side adapter openings 910a–910d. One skilled in the art will recognize that any number of adapter openings 910 will suffice, as long as the adapter openings 910 provide for y connector adapters to be housed within the openings 910, where y is an integer power of 2. FIG. 9 illustrates four openings 910a–910d.

FIG. 10, a back view of the retainer panel 230, illustrates that two duplex optical connector adapters 400 are vertically mounted into each of the adapter openings. One skilled in the art will recognize that the adapter openings 910 may be adapted to receive one or more connector adapters 400, and need not necessarily accommodate exactly two adapters 400.

FIGS. 9 and 11 illustrate that the side portions 960, 970 of the retainer panel 230 are labeled to indicate "in" and "out" ports. The vertical placement of connector adapters 40 within the retainer panel 230 allows for connectors for cables carrying optical signals into a fiber optic communications system 1100 to be aligned side-by-side. Similarly, connectors for cables carrying optical signals out of a fiber optic communications system 1100 may also aligned sideby-side. This side-by-side vertical orientation of connector adapters 400 within the retainer panel 230 provides distinct advantages over the panels 600, 630, 660, 700, 730, 760, 800, 830, 860 ("the other panels") illustrated in FIGS. 6A–6E, 7A–7E, and 8A–8F.

The side-by-side placement of vertically-mounted connector adapters 400 allows for all incoming cables to be connected to the upper row of ports and all outgoing cables to be connected to the lower row of ports. This orientation mimics the binary "on" and "off" nature of a binary digit. This orientation also mimics the left-to-right orientation of printed words in most Western languages. The orientation also provides for much less crossing of cables than the other panels would allow if they were mounted horizontally to provide a side-by-side series of horizontally-mounted connector adapters 400. This feature is desirable because the individual fibers within a fiber optic cable are extremely fragile. A configuration of cables that provides for fewer cable crossings is therefore desirable. The placement of an upper row of input ports and a lower row of output ports provides an additional advantage. It allows all incoming cables to be introduced from one side of the panel (i.e., from one of the parallel side portions) while the outgoing cables are introduced from the opposite side of the panel. This allows for ease of maintenance, in that it is visually readily apparent to technicians, programming and test personnel, and other operators which cables carry incoming optical signals and which cables carry outgoing optical signals. This allows for quicker access and repair time.

Figure 7E:
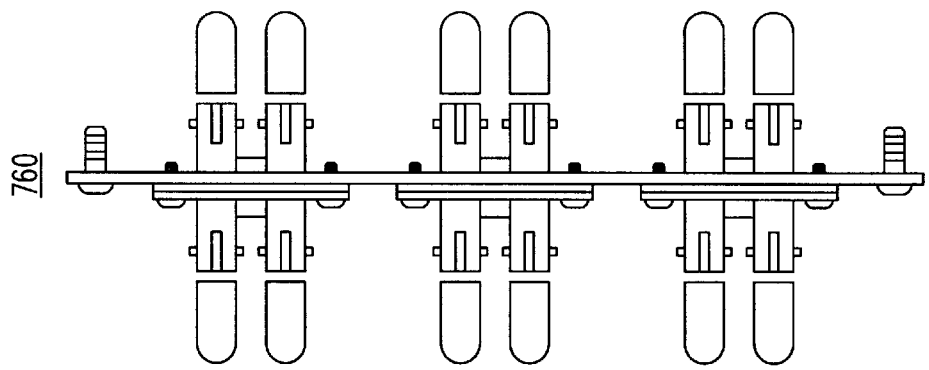
FIGS. 7A, 7B, 7C, 7D, and 7E illustrate various embodiments of adapter plates for ST-style connectors.
Figure 7D:
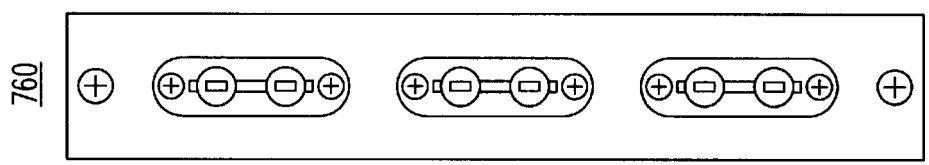
Figure 7C:
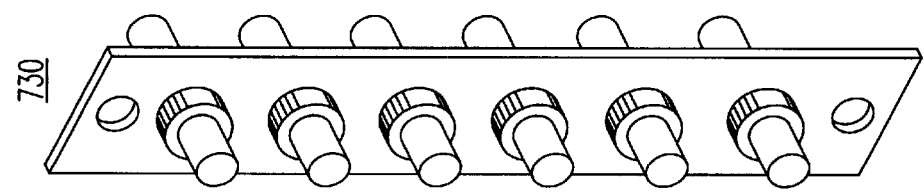
Figure 7B:
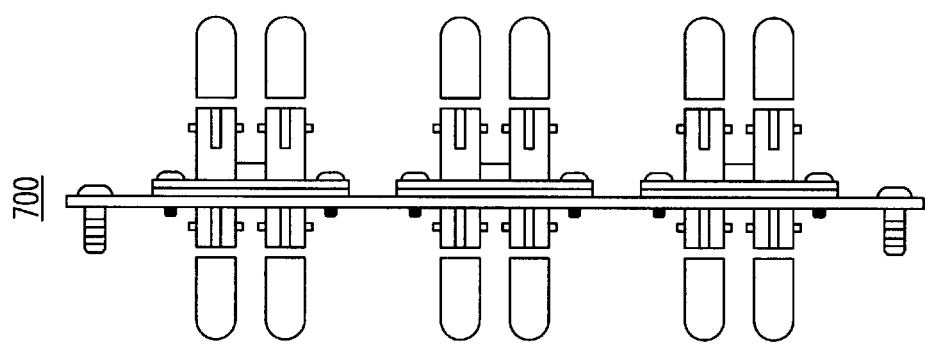
Figure 7A:
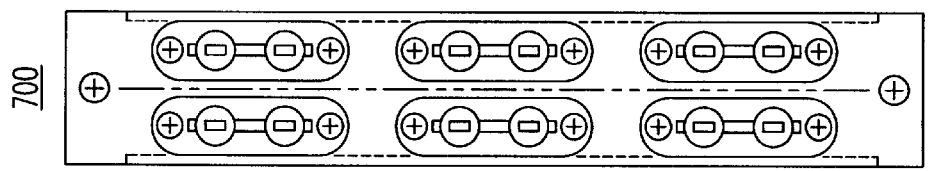

An additional advantage of the vertical orientation is that it provides for a denser placement of connectors within the plate, as compared with prior art panels. For instance, the area of a typical 12-port duplex ST-to-ST adapter panel 700, such as that illustrated in FIGS. 7A and 7B, is approximately 6.1 in$^2$. By accommodating twelve adapter ports, the panel 700 requires an approximate average of 0.51 in$^2$ per port. In contrast, the area of the retainer panel 230 illustrated in FIG. 9 and FIG. 10, in at least one embodiment, is approximately 5.9 in$^2$. By accommodating sixteen adapter ports, the retainer panel 230 requires an approximate average of 0.37 in$^2$ per port. The retainer panel 230 of the present invention, due to the vertical placement of connector adapters 40 within the retainer panel 230, provides for a significantly more dense placement of optical connectors within the retainer panel 230. This distinction becomes even more pronounced when the comparison is made between panels that hold commercial shuttered adapters versus panels that utilize optical safety clips such as those disclosed in commonly assigned U.S. patent application Ser. No. 09/874,904, filed Jun. 2, 2000, entitled "Optical Safety Clip", and U.S. patent application Ser. No. 09/586,420, filed Jun. 2, 200, entitled "Multi-Part Optical Safety Clip", both of which are herin incorporated by reference in their entirety. FIG. 2 illustrates a side view of retainer panels 230 in use. A number y of connector adapters 400 are mounted to the retainer panels 230, where y is an integer power of 2. The retainer panels 230 are mounted to the housing chassis 200. A first connector 100 is mated with a second connector 120 by securing the first and second connectors 100,120 within the connector adapters 400. The first mating connectors 100 extend outwardly from the front surface 940 (FIG. 9) of the retainer panel 230 at a substantially orthogonal angle. Similarly, the second mating connectors 120 extended outwardly from the back surface 1010 (FIG. 10) of the retainer panel 230 toward the interior of the chassis 200 at a substantially orthogonal angle.

Figure 12:
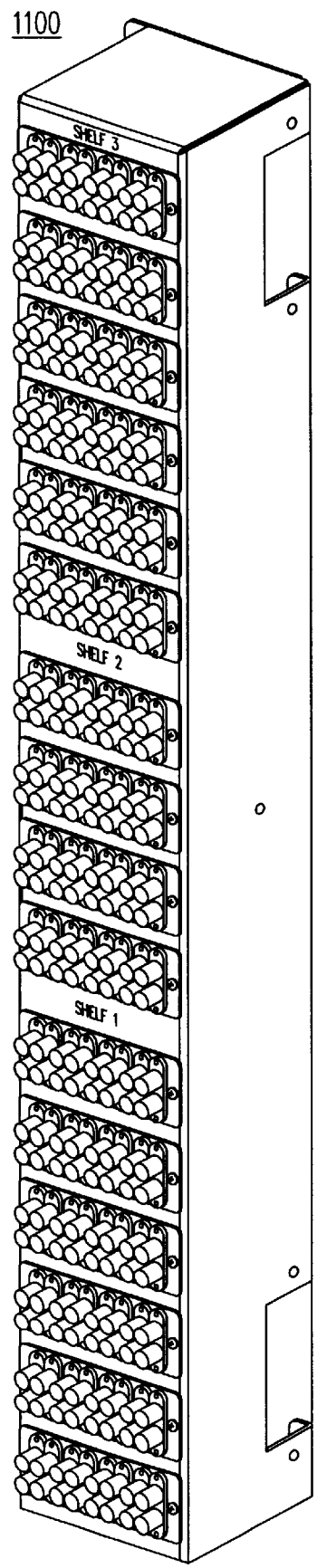
FIG. 12 is a plan view of a system employing optical connector retainer panels according to at least one embodiment of the present invention.

FIGS. 11 and 12 illustrate a connector retainer system 1100 that utilizes a series of retainer panels 230 mounted in a top-to-bottom (i.e., horizontal series) orientation within a housing chassis 200. The system includes sixteen retainer panels 230, with each panel including eight duplex connector adapters. Each retainer panel 230 therefore encompasses sixteen connector ports. The lower row of connector ports is labeled as a row of "out" ports while the upper row of ports is labeled as a row of "in" ports. The relative terms "in" and "out" are used with reference to an operator standing outside the housing chassis 200 and facing it.

Alternative Embodiments

Other embodiments are within the scope of the following claims. For example, while the specific implementation discussed above contemplates that the energy source emitting from the energy source opening 306 is a laser source, it will be appreciated that a shielding system in accordance with the present invention will be applicable to a system that emits any energy source, such as another form of light wave, such as an X-ray.

Also, for example, while particular types of connectors have been discussed to illustrate particular features of various embodiments of the retainer panel and system described above, it will be appreciated that the retainer panel in accordance with the present invention can be used with any type of optical connector, including connectors conforming to the SC, ST, and FC standards as well as those conforming to the enterprise systems connection ("ESCON") standard and those conforming to the Fiber Distributed Data Interface ("FDDI") standard. International Business Machines ("IBM") developed the latter two standards.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

What is claimed is:

1. A connector retainer panel for use in fiber optic communications, comprising:

a planar frame having a front surface and a back surface;
the fame defining a plural number of adapter openings, the plural number being a positive integer power of 2 and corresponding to a register size of a hardware and a software structure for use in controlling and monitoring said fiber optic communications;
each of the adapter openings being adapted to releasably receive at least one connector adapter in a vertical orientation, the at least one connector adapter being selected from a plurality of types of connector adapters, each of the plurality of types of connector adapters having one or more sets of two ports, each port being adapted to releasably secure a set of first and second mating connectors; and
the adapter openings being disposed within the frame in a side-by-side orientation.

2. The panel recited in claim 1, wherein:

the frame further comprises an upper frame portion and a lower frame portion; and
the frame further defines a plurality of mounting holes, one mounting hole being defined along the upper frame portion to correspond to each of the at least one connector adapter, one mounting hole being defined along the lower frame portion to correspond to each of the at least one connector adapter.

3. The panel recited in claim 1, wherein each of the last one connector adapter comprises a duplex optical fiber connector adapter.

4. The panel recited in claim 1, wherein each of the adapter openings is adapted to releasably receive two duplex fiber optic connectors, the duplex fiber optics connectors being disposed within the adapter opening in a side-to-side relation.

5. A connector retainer system for use in fiber optic communications, comprising:

a chassis that includes a wall, the wall defining a plurality of frame openings oriented in a top-to-bottom relation;
a plurality of planar frames, each frame being shaped to be substantially rectangular, each frame being coupled to one of the frame openings such that the frame lies in a horizontal orientation in relation to an axis parallel to the longer sides of the frame, the planar frames having a front surface and a back surface, each of the planar frames defining a plural number of adapter openings, the plural number being a positive integer power of 2 and corresponding to a register size of a hardware and a software structure for use in controlling and monitoring said fiber optic communications, the adapter openings being disposed within the frames in a side-to-side relation;
a plurality of connector adapters, the connector adapters being selected from a plurality of types of connector adapters, each of the plurality of types of connector adapters having one or more sets of two ports, each port being adapted to releasably secure a set of first and second mating connectors, each of the adapter openings being adapted to releasably receive one or more of the connector adapters in a vertical orientation;
a plurality of first mating connectors secured to the connector adapter ports, the connector adapters being releasably oriented within the adapter openings so that the first mating connectors extend outwardly from the front surface of the frame at a substantially orthogonal angle, the connector adapters being releasably coupled within the adapter openings in a vertical orientation; and
a plurality of second mating connectors secured to the connector adapter ports, the connector adapters being releasably oriented within the adapter openings so that the second mating connectors extend outwardly from the back surface of the frame at a substantially orthogonal angle.

6. The system recited in claim 5, wherein:

each of the plurality of frames further comprises an upper frame portion and a lower frame portion; and each of the plurality of frames further defines a plurality of mounting holes, one mounting hole being defined along the upper frame portion to correspond to each of the at least one connector adapters that the adapter opening is adapted to releasably receive, one mounting hole being defined along the lower frame portion to correspond to each of the at least one connector adapters that the adapter opening is adapted to releasably receive.

7. The system recited in claim 5, wherein each of the plurality of connector adapters is a duplex fiber optic connector.

8. The system recited in claim 5, wherein each of the adapter openings is adapted to releasably receive two duplex fiber optic connectors, the duplex fiber optic connectors being disposed within the adapter opening in a side-to-side relation.

9. A method for providing a connector retainer system for use in fiber optic communications, comprising:

coupling a plurality of substantially rectangular planar frames to a chassis, the chassis having a wall that defines a plurality of frame openings, each of the plurality of planar frames defining a plural number of adapter openings, the plural number being a positive integer power of 2 and corresponding to a register size of a hardware and a software structure for use in controlling and monitoring said fiber optic communications, the plurality of planar frames being coupled to the chassis in a top-to-bottom relation, wherein each frame lies in a horizontal orientation in relation to an axis parallel to the longer sides of the frame;

releasably coupling a plurality of connector adapters to the adapter openings in a side-to-side relation, the plurality of connector adapters being releasably coupled to the adapter openings in a vertical orientation, each of the connector adapters having a set of two ports; and coupling at least one set of mating first and second connectors to the plurality of connector adapters.

10. The method recited in claim 9, wherein the releasably coupling a plurality of connector adapters further comprises releasably coupling a plurality of duplex fiber optic connector adapters.

11. The method recited in claim 9, wherein the releasably coupling a plurality of connector adapters to the adapter openings further comprises releasably coupling two duplex fiber optic connector to the adapter openings.

12. The method recited in claim 9 further comprising coupling at least one set of mating first and second optical connectors to the plurality of connector adapters.

13. A connector retainer system for use in fiber optic communications, comprising:

a plurality of frame means for releasably coupling a plural number of connector adapters together in a side-by-side relation, the frame means providing a means for releasably coupling the connector adapters in a vertical orientation, the plural number being a positive integer power of 2 and corresponding to a register size of a hardware and a software structure for use in controlling and monitoring said fiber optic communications;

a chassis means for coupling the plurality of frame means together in a top-to-bottom relation; and at least one connector means coupled to at least one of the connector adapters, the connector means providing a means for joining two optical fiber cables.

14. The connector system recited in claim 13, wherein the frame means further comprisess at least on first mounting means for releasably coupling the frame means to the connector adapters.

15. The connector system recited in claim 13, wherein the frame means further comprises at least one second mounting means for coupling the frame means to the chassis means.

* * * * *